Nov. 24, 1970    W. T. WUENSCH    3,543,080
CRT PINCUSHION DISTORTION CORRECTION APPARATUS
Filed Nov. 4, 1968    2 Sheets-Sheet 1

INVENTOR.
WALTER T. WUENSCH
BY Ronald Zibell

ATTORNEYS

United States Patent Office 3,543,080
Patented Nov. 24, 1970

1

3,543,080
CRT PINCUSHION DISTORTION CORRECTION
APPARATUS
Walter T. Wuensch, Ontario, N.Y., assignor to Xerox Corporation, Rochester, N.Y., a corporation of New York
Filed Nov. 4, 1968, Ser. No. 773,045
Int. Cl. H01j 29/76
U.S. Cl. 315—27    6 Claims

ABSTRACT OF THE DISCLOSURE

An electrical circuit for generating a non-symmetrical parabolic signal by altering the reference level of an integrator prior to the integration of a ramp signal and for simultaneously adjusting the magnitude of the parabolic signal and constant level signal combined with the parabolic signal.

BACKGROUND OF THE INVENTION

This invention relates to the electrical circuits for correcting pincushion distortion occurring in cathode ray tubes and relates specifically to means for shaping a non-symmetrical parabolic correction signal.

Cathode ray tubes are commonly used as scanning devices since they provide a high speed inertia free device for detecting intelligence information. The light generated by the electron beam striking a fluorescent tube face is used to illuminate the scanned object. A complete scan of an object is commonly obtained by advancing the object along a path perpendicular to a straight line trace made on the tube face. The electron beam will cause the fluorescent material on the tube face to burn if the trace is allowed to follow the same path over a period of time and for this reason it is advisable to periodically move the trace to a new location on the tube face. However, when the trace is moved to a position other than through the geometric center of the tube face the trace becomes subjected to pincushion distortion. The distortion causes a curving of the trace and is due solely to the geometry of the tube face. Whenever the surface of the tube face has a radius of curvature that is not the same as the shortest distance measured between the deflection point of the beam and the surface of the tube face, pincushion distortion will distort a trace not positioned through the geometric center of the tube face. For an analysis of pincushion distortion, refer to volume 22 of MIT Radiation Laboratory Series on cathode ray tubes at Chapter 8, page 313.

Tube faces or targets in most cathode ray tubes are spherical but they have a radius of curvature much greater than the shortest length measured between the deflection point of the electron beam and the surface of a tube face. The distortion causes the trace to assume a shape that is approximated by a parabola and the distortion can be corrected by applying a parabolic signal to the cathode ray tube deflection system. The magnitude of the distortion increases linearly from zero to a maximum as a trace is moved from the center to an extremity of the tube face. In addition, the parabolic distortion is non-symmetrical if the electron beam, while positioned at the

2 geometric center of the tube face is not perpendicular to the surface of the tube face.

Pincushion correction circuits are commonly employed in television systems where the electron beam inscribes a series of straight lines to form a rectangular pattern known as a raster. The correction circuits used in these systems are unnecessarily complicated for use in a scanning system where the trace consists of a single straight line. The television circuits correct for distortion occurring in both the horizontal and vertical axis and must contend with a constant change in the magnitude of the distortion in both axis. With a single straight line trace the magnitude of the distortion changes only when the trace is moved to a new location on the tube face therefore there is no need for the complicated television circuitry. Also, the correction signal need be applied only to one axis in a single line scan system since the distortion in the remaining axis affects the length and speed of the trace and not its shape. Methods well known in the art are available to correct for these length and speed variations.

It is accordingly an object of the present invention to simplify means for correcting pincushion distortion occurring in a cathode ray tube used for scanning intelligence information.

It is another object of the invention to improve means for correcting pincushion distortion occurring in a single axis of a cathode ray tube.

It is another object of the invention to improve means for compensating for non-symmetrical pincushion distortion occurring in a cathode ray tube.

It is another object of the invention to simplify means for adjusting the magnitude of a correction signal applied to the deflection circuit of a cathode ray tube.

It is another object of the invention to improve means for generating an electrical signal having a non-symmetrical parabolic waveform.

SUMMARY OF THE INVENTION

The present invention provides novel and simplified means for correcting pincushion distortion in a cathode ray tube. Circuitry is provided for generating a parabolic correction signal and for rendering the signal non-symmetrical if a particular tube should require it. The circuit automatically adjusts the magnitude of the correction signal when a trace is moved to a new position on the tube face and a polarity switch is provided to invert the sign of the correction signal when the trace is repositioned across the geometric center of the tube face.

DESCRIPTION OF THE DRAWINGS

Further objects and features of the invention will become apparent by reading the following description in connection with the drawings wherein.

DESCRIPTION OF THE PREFERRED EMBODIMENT

The present system is designed to correct pincushion distortion by generating and applying a parabolic correction signal to the deflection system of a cathode ray tube (CRT). The correction signal enables the CRT trace to assume a straight line shape wherever it is positioned on the tube face. The correction signal is applied only to the vertical deflection axis since the distortion in the horizontal axis affects the length and speed of the trace and not its shape.

Pincushion distortion in the horizontal axis causes the length of the trace to increase from a minimum to a maximum length when the trace is moved from the center to an extremity of the tube face. The increase in trace length is compensated for in a scanning system by adjusting the magnitude of the horizontal sweep signal. The magnitude of the sweep signal determines the length of the trace while the period of the sweep signal determines the time required for the electron beam to travel the particular length. Altering the amplitude of the sweep signal therefore permits the length of the trace to be adjusted without affecting the timing of the system.

Figure 1:
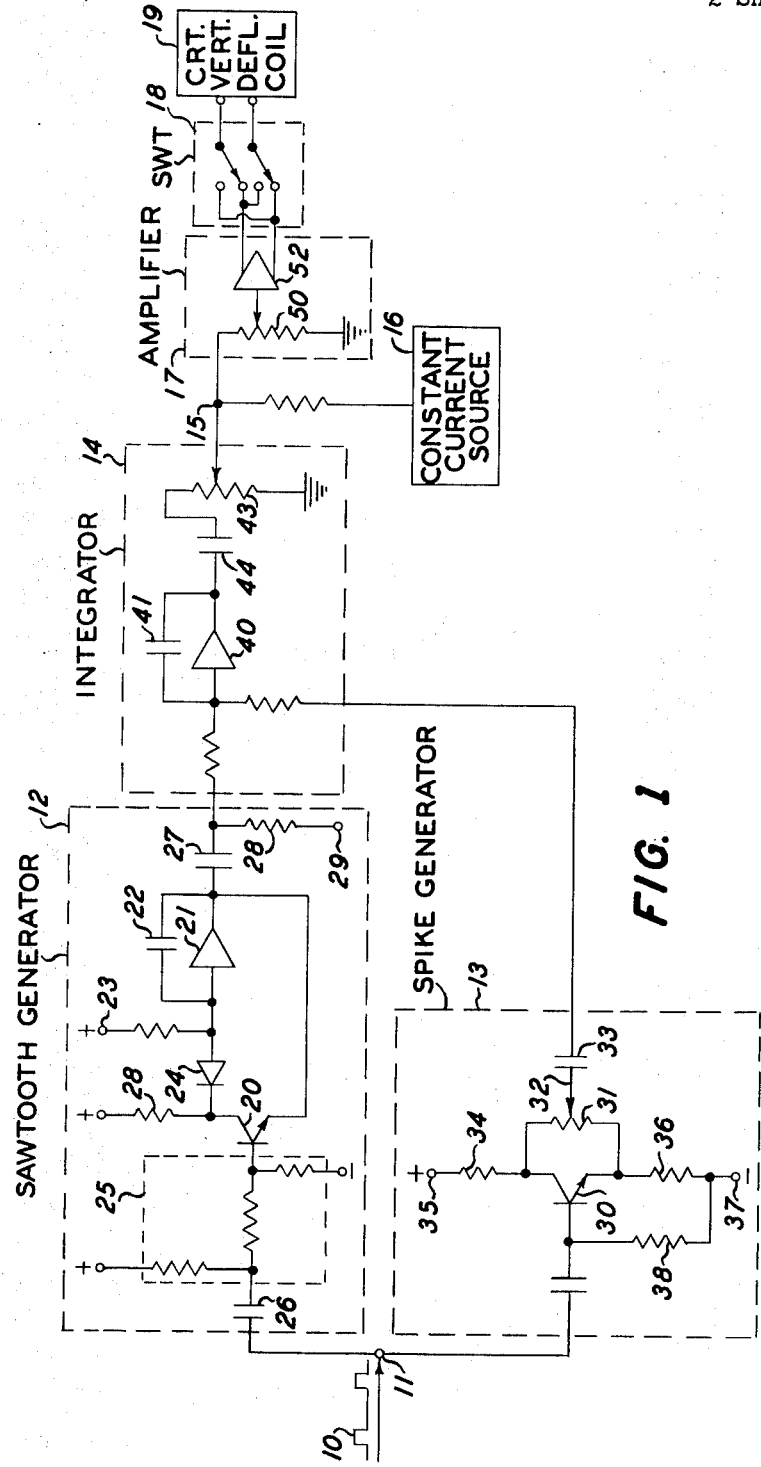
FIG. 1 shows the circuitry of the present system included in functional blocks.

As seen in FIG. 1, the CRT synchronization pulse 10 is the input to the system. The system generates a parabolic signal and applies it to the vertical deflection coil of the CRT simultaneous with the application of the horizontal sweep signal to the horizontal deflection coil. The magnitude of the correction signal is proportional to the magnitude of the pincushion distortion occurring at a particular position on the face of a CRT. The polarity of the correction signal is the inverse of the polarity associated with the distortion. The resultant trace is free of pincushion distortion wherever it is positioned on the face of the CRT.

Figure 2A:
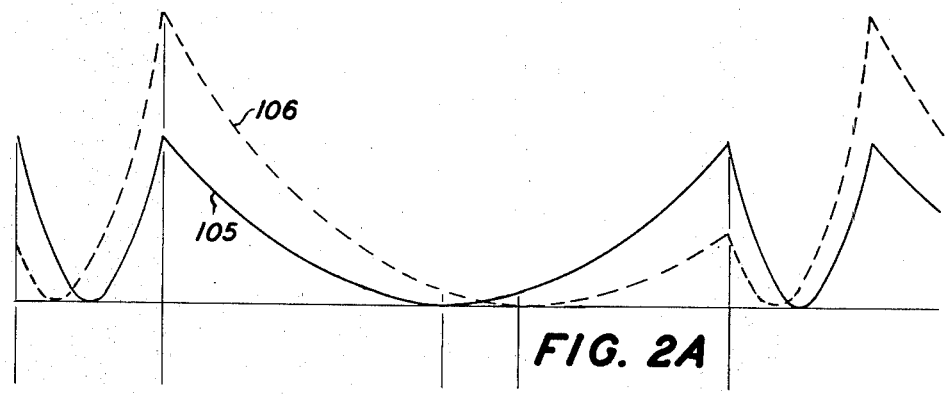
FIGS. 2(a) through 2(d) show the waveform of the signals generated by the system.
Figure 2B:
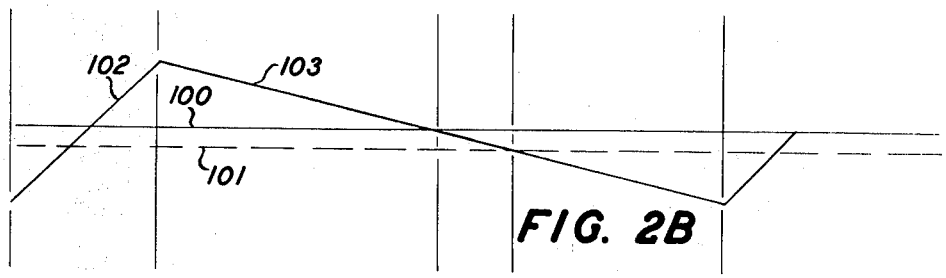
Figure 2C:
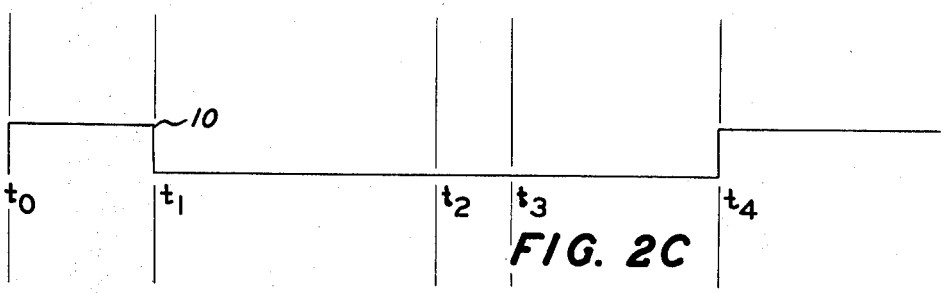
Figure 2D:
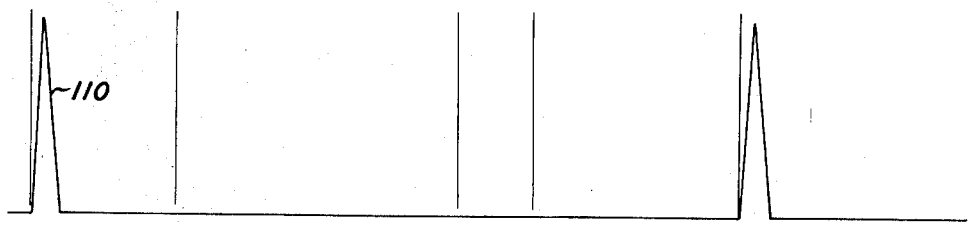

The operation of the system will first be explained in connection with the functional blocks of FIG. 1 followed by a detailed explanation of the circuitry contained in each block. The waveforms and relative timing of the signals generated by the system are shown in FIG. 2. The leading edge of a sync pulse 10 received at terminal 11 simultaneously initiates the generation of a ramp signal at the output of the sawtooth generator 12 and a spike signal at the output of the spike generator 13. Each of these signals is applied to integrator 14. Integrator 14 has a voltage reference level for determining the sign of an input signal, e.g., when the amplitude of an input signal extends above the reference level it is assigned a plus sign and is assigned a negative sign when it extends below the reference level. The input to integrator 14, the sawtooth signal, is referenced to the same voltage level as integrator 14 and it is symmetrical about the reference level having equal portions of its cycle extending above and below the reference level. Integration of the ramp portion of the sawtooth signal therefore produces a symmetrical parabolic signal as long as the integrator reference level is not disturbed. Spike signal 110 (FIG. 2(d)) is applied to integrator 14 to raise or lower the integrator reference level thereby causing the generation of a non-symmetrical parabolic signal. This operation is understood more clearly by referring to FIG. 2. The sawtooth signal is shown in FIG. 2(b) and the line 100 represents both the sawtooth and integrator reference levels. As long as the integrator reference level coincides with that of the sawtooth signal, the integration of the ramp 103 from time $t_1$ to $t_4$ results in the generation of the symmetrical parabolic signal 105 (FIG. 2(a)) because the point at which ramp 103 crosses reference line 100, i.e., the point at which the ramp undergoes a sign change, is midway between time $t_1$ and $t_4$, namely time $t_2$. The integration of the ramp over equal time periods with the ramp having an opposite sign in each period, results in the production of a symmetrical parabola. In other words, as long as the ramp signal undergoes a change in sign at time $t_2$ the integration will produce a symmetrical signal. When the integrator reference level is raised or lowered the point at which ramp 103 undergoes a sign change moves to the left or right of time $t_2$. Therefore, when the integrator reference level is moved to a position such as that of line 101, the integration of the ramp signal yields the non-symmetrical signal 106 shown in FIG. 2(a). In this case ramp 103 undergoes a change in sign at time $t_3$ and the ramp is positive for a longer period than it is negative (time period $t_1$ to $t_3$ > time period $t_3$ to $t_4$) with the resultant integration producing non-symmetrical parabola 106.

The parabolic signal produced at the output of integrator 14 is combined at junction 15 with a signal from a constant current source 16. The constant level signal is used to position the trace at various vertical positions on the face of the CRT. The combined constant level and parabolic signal is applied to potentiometer 50 in the input network of isolation amplifier 17. Since the parabolic and constant level signals are combined prior to being applied to potentiometer 50 a single adjustment of the potentiometer 50 not only positions the trace to a desired position on the face of the CRT but also simultaneously scales the magnitude of the parabolic correction signal.

The simultaneous scaling of the correction signal during the positioning of the trace is accomplished in the following manner. The potentiometer 50 is adjusted to position the trace at an extreme position from the geometric center of the CRT tube face. The potentiometer 43, in the output network of integrator 14, is then adjusted to the proper magnitude to correct the distortion in the trace at this extreme position. The magnitude of the pincushion distortion varies linearly between the extreme position and the center of the CRT tube face and potentiometer 50 causes a proportional linear displacement in the position of the trace and linear scaling of the pincushion correction signal as the potentiometer is adjusted to its lower terminal. The lower terminal of the potentiometer is connected to an appropriate potential in order to position the trace through the center of the CRT tube face.

The output of amplifier 17 is applied through polarity switch 18 to the CRT vertical deflection coil 19. The system is normally calibrated for positioning a trace above the centerline of the CRT tube face. When it is desired to position the trace below the centerline the polarity switch is thrown to reverse the polarity of the signal applied to the vertical deflection coil.

The following discussion refers to a CRT deflection system wherein a coil is used to generate a magnetic field for deflecting the electron beam. The circuitry discussed therefore are current controlling devices but it is understood that equivalent voltage control circuits can be devised for a deflection system wherein conductive plates are used to generate an electrical field for deflecting the electron beam.

The specific circuitry of the system will now be discussed. The circuitry of the sawtooth generator 12 is shown n FIG. 1. The operational amplifier 21 has capacitor 22 in its feedback path to enable it to function as an integrator. Transistor 20 is normally non-conducting and the input to operational amplifier or integrator 21 for this condition is a constant level voltage supplied by positive potential source 23. Diode 24 is back biased by power supply 28 while transistor 20 is in a non-conducting state. The integrator 21 generates a negative-going ramp signal at its output during the non-conducting state of transistor 20 because the transfer function of integrator 21 causes a reversal in the sign of the input signal. The output of integrator 21 is fed back to the emitter of transistor 20 to enhance the switching speed of the transistor.

The input to integrator 21 falls from the positive potential level to a negative level when transistor 20 is rendered conductive by the leading edge of sync pulse 10. The collector of transistor 20 effectively assumes the negative potential level of the output of integrator 21 due to the feedback path between the integrator 21 and the emitter of transistor 20. The collector remains at a negative potential until the trailing edge of sync pulse 10 resets transistor 20 to a non-conducting state.

From the foregoing it is seen that the ramp portion 103 (FIG. 2(b)) of the sawtooth signal is generated during the nonconducting period of transistor 20 and the rise portion 102 of the signal is generated during the conducting period of transistor 20. The transistor 20 is triggered to a conductive state by leading edge of sync pulse 10 applied through capacitor 26 and bias network 25 to the base of transistor 20. The trailing edge of the sync pulse 10 resets the transistor 20 to its normal non-conducting state.

The sawtooth signal generated by sawtooth generator 12 is AC coupled through capacitor 27 to integrator 14. The sawtooth signal is referenced about the voltage level potential applied to terminal 29. The integrator 14 is referenced to the same potential applied at terminal 29 and it is this level about which the integrator determines the sign of an input signal for purposes of integration. The reference level of the integrator may be defined as the initial potential applied to the integrating capacitor of integrator 14 before the ramp portion of the sawtooth signal is initiated.

If desired, the sawtooth signal may be used as the horizontal sweep signal to produce the straight line trace on the CRT tube face.

Integrator 14 is comprised of operational amplifier 40 with capacitor 41 in its feedback path. The function of integrator 14 is to produce a parabolic signal from the sawtooth signal applied at its input. With no input from the spike generator 13, the parabolic signal produced by integrator 14 is symmetrical. The spike signal, depending on its polarity, is used to charge the capacitor 41 to a potential above or below the reference level of integrator 14 and thereby effectively change the integrator reference level used to determine the sign of an input signal.

Spike signal 110 is produced by generator 13 at substantially the same time that sync pulse 10 turns transistor 20 in the sawtooth generator 12 to a conducting state, i.e., at the start of the rise period of he sawtooth signal, time $t_0$ in FIG. 2. The rise period of the sawtooth signal, $t_0$ to $t_1$ in FIG. 2(a) is used to charge capacitor 41 to a desired potential level above or below the integrator reference level. The subsequent integration of the ramp portion of the sawtooth signal results in a non-symmetrical parabolic signal such as that shown by curve 106 in FIG. 2(a). Curve 106 is non-symmetrical because the integrator reference level is lowered causing ramp 103 to change sign at time $t_3$ rather than at time $t_2$.

The spike signal is generated by capacitor 33 in spike generator 13 when transistor 30 changes from a normally non-conducting state to a conducting state. The function of capacitor 33 is therefore to differentiate a step function generated by transistor 30 to produce a spike signal. The potentiometer 31 coupled between the emitter and collector electrodes of transistor 30 provides means for applying either a positive or negative step function to capacitor 33 through wiper arm 32. Potential source 35 is coupled to the collector of transistor 30 through resistor 34 and potential source 37 is coupled to the emitter of transistor 30 through resistor 36. The resistor 38 provides base to emitter bias for transistor 30.

The resistors 34 and 36 and potentiometer 31 comprise a voltage divider network that permits a desired voltage level to be applied to capacitor 33 through wiper arm 32 during the period that transistor 30 is in a non-conducting state. The leading edge of sync pulse 10, $t_0$ in FIG. 2, applied through capacitor 39, triggers transistor 30 changing it to a conducting state. The potentiometer is effectively short circuited during this time and a new potential level determined by the values of resistors 34 and 36 is applied to capacitor 33. This instantaneous change in voltage at capacitor 33, whether positive or negative, causes the spike signal to be generated by capacitor 33. The spike signal is in turn applied to integrator 14 to charge the capacitor 41 to some potential above or below the reference level of integrator 14.

The transistor 30 is returned to a non-conducting state by the trailing edge of sync pulse 10, time $t_1$ in FIG. 2. The return of the transistor 30 to its initial state results in the generation of a spike opposite in polarity to the spike generated at time $t_0$. The spike generated at time $t_1$ does not effectively alter the reference level of integrator 14 established by the spike generated at time $t_0$ because the amplitude of the spike occurring at time $t_1$ is dampened by the charge acquired by capacitor 33 during the conducting period of transistor 30.

In summary, the parabolic correction signal generated by integrator 14 is rendered non-symmetrical to conform to the non-symmetrical distortion in a particular CRT by merely adjusting the wiper arm 32 of potentiometer 31. The adjustment of potentiometer 31 enables the reference level of integrator 14 to be raised, lowered or left at its original level.

The parabolic signal generated by integrator 14 is coupled through capacitor 42 to potentiometer 43. Potentiometer 43 provides means for adjusting the magnitude of the correction signal before it is combined with the constant level signal from constant current source 16 at terminal 15.

The combined signal formed at terminal 15 is applied to potentiometer 50. The wiper arm 51 is used to position a trace between the center and an extremity of the CRT face. The potentiometer 50 is connected to an appropriate potential at its lower terminal to permit the trace to be positioned at the center of the CRT tube face when wiper arm 51 is adjusted to this lower terminal.

The correction signal is thereafter applied to the vertical deflection coil 19 of a CRT through amplifier 52 and polarity switch 18.

The cathode ray tube deflection system of the present invention utilizes novel means for generating a non-symmetrical parabolic signal. The means employed can readily be adapted to other systems requiring a non-symmetrical parabolic signal. Therefore, the present means for generating a non-symmetrical signal is not intended to be limited to a cathode ray tube deflection system.

Having thus described the present invention, it will be clear that many modifications and deviations therefrom may now be readily devised by those skilled in the art, and such modifications and deviations will come within the scope of this invention. Consequently, the invention herein disclosed is to be construed broadly and limited only by the spirit and scope of the appended claims.

What is claimed is:

1. A spike signal generator having input and output terminals comprising:
   a transistor having collector, emitter and base electrodes,
   first and second voltage potential sources,
   a first resistor coupled between said collector electrode and said first potential source,
   a second resistor coupled between said emitter electrode and said second potential source,
   a potentiometer having variable and non-variable terminals coupled between said collector and emitter electrodes at non-variable terminals of said potentiometer,
   a first capacitor coupled between a variable terminal of said potentiometer and said output terminal,
   a third resistor coupled between said base electrode and said second potential source, and
   a second capacitor coupled between said input terminal and said base electrode.

2. A cathode ray tube deflection system comprising:
   a sawtooth generator to produce a sawtooth signal having a rise period and a ramp period,
   an integrator coupled to the output of said sawtooth generator, said integrator having a variable reference level positioned between the minimum and maximum amplitude values of said sawtooth signal thus producing a parabolic signal output during integration of the sawtooth signal over its ramp period, said integrator comprising an operational amplifier having a capacitor in its feedback path, control means to vary the reference level of said integrator above and below the midpoint amplitude of said sawtooth signal to render the resulting parabolic signal non-symmetrical, said control means comprising a signal generator to produce a signal to charge said operational amplifier feedback capacitor to a voltage potential above or below said integrator reference level during the rise period of said sawtooth signal, and a cathode ray tube having a deflection electrode and coupling means to apply the parabolic signal output of said integrator to said cathode ray tube deflection electrode.

3. A cathode ray tube deflection system comprising:

a sawtooth generator to produce a sawtooth signal having a rise period and a ramp period, an integrator coupled to the output of said sawtooth generator, said integrator having a variable reference level positioned between the minimum and maximum amplitude values of said sawtooth signal thus producing a parabolic signal output during integration of the sawtooth signal over its ramp period, said integrator comprising an operational amplifier having a capacitor in its feedback path, control means to vary the reference level of said integrator above and below the midpoint amplitude of said sawtooth signal to render the resulting parabolic signal non-symmetrical, said control means comprising a signal generator to produce a signal to charge said operational amplifier feedback capacitor to a voltage potential above or below said integrator reference level during the rise period of said sawtooth signal, and a cathode ray tube having a deflection electrode and coupling means to apply the parabolic signal output of said integrator to said cathode ray tube deflection electrode, said coupling means comprising a first potentiometer coupled to said integrator to adjust the amplitude of a parabolic signal produced by the integrator, a constant energy source to supply a constant level signal, a terminal coupled to said first potentiometer and to said constant energy source to combine said parabolic and constant level signals, a second potentiometer coupled to said terminal to adjust the amplitude of said combined parabolic and constant level signal, an amplifier coupled to said second potentiometer to amplify said combined parabolic and constant level signal, and a polarity switch coupled to the output of said amplifier and to said cathode ray tube deflection electrode to invert the polarity of said combined signal applied to the cathode ray tube.

4. A cathode ray tube deflection system comprising:

a sawtooth generator to produce a sawtooth signal having a rise period and a ramp period, an integrator coupled to the output of said sawtooth generator, said integrator having a variable reference level positioned between the minimum and maximum amplitude values of said sawtooth signal thus producing a parabolic signal output during integration of the sawtooth signal over its ramp period, said integrator comprising an operational amplifier having a capacitor in its feedback path, control means to vary the reference level of said integrator above and below the midpoint amplitude of said sawtooth signal to render the resulting parabolic signal non-symmetrical, said controls means comprising a signal generator to produce a signal to charge said operational amplifier feedback capacitor to a voltage potential above or below said integrator reference level during the rise period of said sawtooth signal, said control means signal generator comprising first and second voltage potential sources, a potentiometer having variable and non-variable terminals, first and second resistors coupled to said first and second potential sources respectively and to non-variable terminals of said potentiometer, a capacitor coupled to a variable terminal of said potentiometer, a switch coupled in parallel with said potentiometer at non-variable terminals to effectively short circuit the potentiometer at substantially the instant in time that marks the beginning of the rise period of said sawtooth signal and to remove the short circuit at substantially the instant in time that marks the end of the rise period of said sawtooth signal, and a cathode ray tube having a deflection electrode and coupling means to apply the parabolic signal output of said integrator to said cathode ray tube deflection electrode.

5. A parabolic signal generator comprising:

a sawtooth generator to produce a sawtooth signal having a rise period and a ramp period, an integrator coupled to the output of said sawtooth generator, said integrator having a variable reference level positioned between the minimum and maximum values of said sawtooth signal, thus producing a parabolic signal output during integration of the sawtooth signal over its ramp period, said integrator comprising an operational amplifier having a capacitor in its feedback path, and control means to vary the reference level of said integrator above and below the midpoint amplitudes of said sawtooth signal to render the resulting parabolic signal non-symmetrical, said control means comprising:

a signal generator to produce a signal to charge said operational amplifier capacitor to a voltage potential above or below the reference potential during the rise period of said sawtooth signal.

6. A parabolic signal generator comprising:

a sawtooth generator to produce a sawtooth signal having a rise period and a ramp period, an integrator coupled to the output of said sawtooth generator, said integrator having a variable reference level positioned between the minimum and maximum values of said sawtooth signal, thus producing a parabolic signal output during integration of the sawtooth signal over its ramp period, said integrator comprises an operational amplifier having a capacitor in its feedback path, control means to vary the reference level of said integrator above and below the midpoint amplitudes of said sawtooth signal to render the resulting parabolic signal non-symmetrical, said control means comprising a signal generator to produce a signal to charge said operational amplifier capacitor to a voltage potential above or below the reference potential during the rise period of said sawtooth signal, and a terminal for receiving a pulse signal having a predetermined on period and off period coupled to said sawtooth generator to produce a sawtooth signal having rise and ramp periods corresponding to the on and off periods respectively of a pulse signal received at said terminal, said control means signal generator being coupled to said terminal to produce a spike signal at substantially the instant in time that marks the beginning of the on period of a pulse signal received at said terminal, said signal generator comprising:

a transistor having collector, emitter and base electrodes, first and second voltage potential sources, a first resistor coupled between said collector electrode and said first potential source, a second resistor coupled between said emitter electrode and said second potential source, a potentiometer having variable and non-variable terminals coupled between said collector and emitter electrodes at non-variable terminals of said potentiometer, a first capacitor coupled to a variable terminal of said potentiometer, a third resistor coupled between said base electrode and said second potential source, and a second capacitor coupled between said terminal and said base base electrode.

References Cited

UNITED STATES PATENTS 2,842,664  7/1958  Martin _____ 307—229X
2,869,026  1/1959  Sanford _____ 315—24

OTHER REFERENCES

Karplus, Analog Simulation, 1958, pp. 233–34.

RODNEY D. BENNETT, Primary Examiner

J. G. BAXTER, Assistant Examiner

U.S. Cl. X.R.

307—229, 261; 315—24